Aug. 24, 1926.
J. CROMIE
1,597,403
SAFETY CONTROL FOR PILOT LIGHTS
Filed Oct. 16, 1925
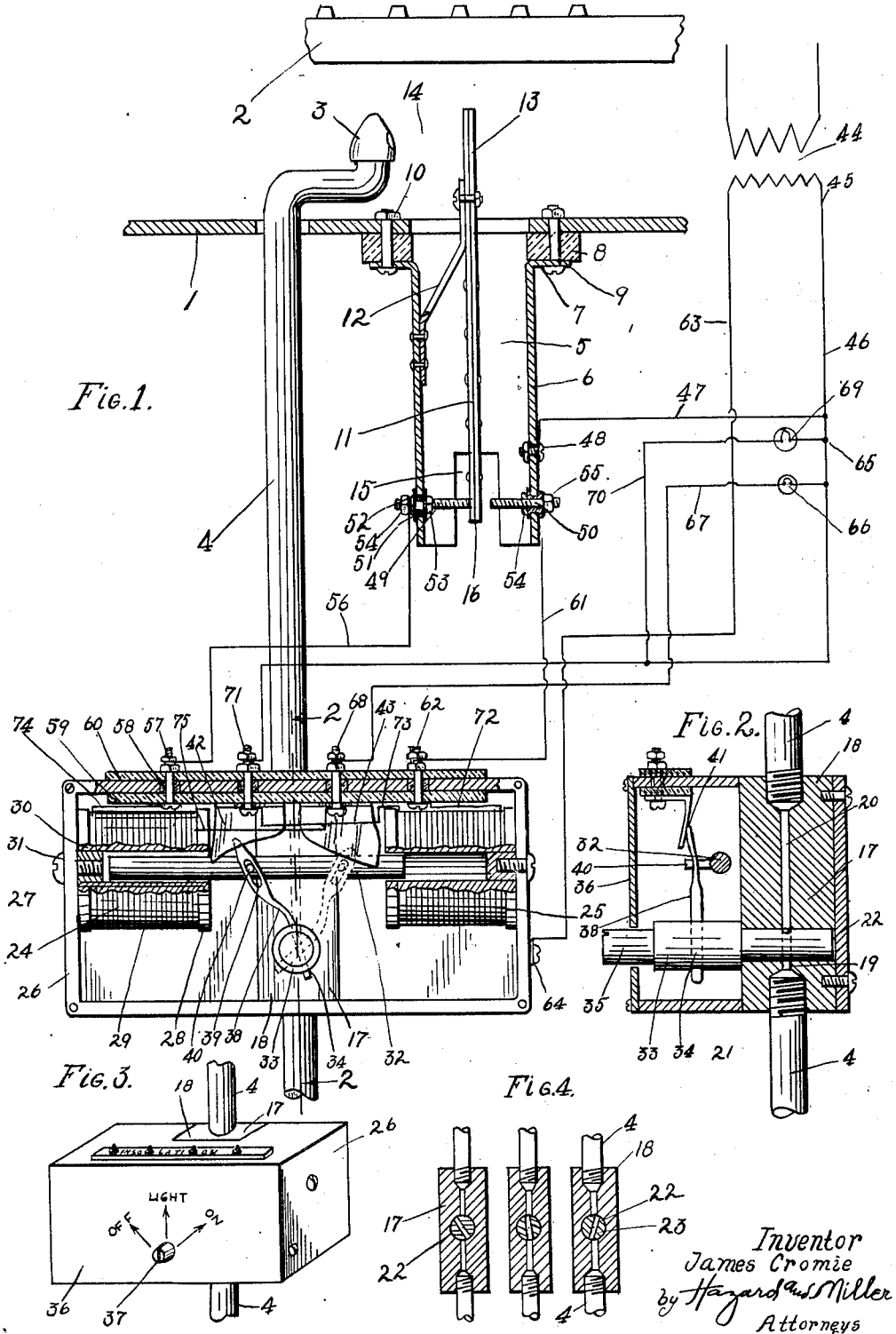
Inventor
James Cromie
by Hazard and Miller
Attorneys Patented Aug. 24, 1926.

1,597,403

UNITED STATES PATENT OFFICE.

JAMES CROMIE, OF PASADENA, CALIFORNIA.

SAFETY CONTROL FOR PILOT LIGHTS.

Application filed October 16, 1925. Serial No. 62,900.

My invention is a safety control for pilot lights adapted to positively turn a gas or pilot light off should the pilot light go out and to give a visible signal when the pilot light is on.

An object of my invention is to form a safety control whereby when a pilot light in a gas heater, whether of the manually manipulated or automatic type goes out, the feed of gas to the pilot will be automatically shut off.

Another feature of my invention is a system of signals preferably by lights which will indicate when the pilot light is burning and give a different signal when the pilot light goes out.

Another feature of my invention is to mount a valve in a gas connection to a pilot light and to position a thermostat in a gas heater to be acted upon by the pilot light, whereby electric circuits may operate the valve to turn the pilot light gas valve off when the pilot light goes out and the thermostatic strip becomes cold. I mount the thermostat in the heater in such position that it will give the indications whether the main burners are in operation or not as the thermostat is practically solely heated by the pilot light.

In connection with the valve operating mechanism I utilize a pair of signal lights with connections to a box or the like, carrying the valve and the electrical valve operating mechanism, the box forming a ground and being part of the electric circuit through the signal lights when the valve is shut off or when the valve is fully opened; thus indicating that the pilot light is out or burning.

Another feature of my invention is the construction of a pilot light valve which is substantially wide open for lighting a pilot light and when said light is lit the electrical device automatically closes the valve slightly, thereby reducing the size of the flame and the amount of gas consumed.

My invention will be more readily understood from the following description and drawings, in which:—

Figure 1 is a diagrammatic view of my installation, indicating a gas heater with a pilot light, a thermostat depending from the heater adjacent the pilot light, a box containing a gas valve for the pilot light, electro-magnetic devices for operating the valve and the electric circuit to control the electro-magnetic devices by the thermostat and to give the visible signals.

Fig. 2 is a section of Fig. 1 on the line 2—2 in the direction of the arrows, showing a section through the valve and indicating the electrical connections made by the valve throwover lever.

Fig. 3 is a perspective view of the outside of the box with the wire disconnected, showing the valve stem and indicia to show the proper positions of the valve.

Fig. 4 is a diagrammatic series of sections through the gas valve, showing its various positions for "off", "light", and "on".

Referring to Fig. 1, my installation comprises a gas heater indicated by the base 1, with gas burners 2 therein and a pilot light 3 having a gas pipe 4 leading through the base of the heater. The heater may be of any type as this is not part of my invention and may be either manually operated, that is the heater valve is manually opened and the gas lit by the pilot light, or an automatic type in which some remote control such as opening a water valve turns on the gas in which the pilot light heats. The pilot light may also be utilized to light an oil burner, it being understood that my thermostat as hereafter described is positioned to be acted upon by the flame from the pilot light and to be substantially uninfluenced by the heat from the burners.

The thermostat 5, I use, is preferably constructed in the form of a tube 6 of circular, rectangular or other suitable cross section. This tube has a flange 7 which is bolted to an insulating porcelain 8, by bolts 9. This porcelain is bolted to the base 1 of the burner by bolts 10. By this construction the thermostat is insulated electrically and substantially thermally from the base of the burner.

My thermostat comprises a thermostatic metal strip 11 of two different kinds of metal, having different co-efficients of expansion so as to occupy one position when cold and a slightly different position when hot. The strip is connected to the tube 6 by means of a supporting brace 12 which is bolted to the tube and rigidly attached to the thermostatic strip. The upper end of the strip 13 is in such a position as to be acted upon by the flame 14 indicated by the dotted lines from the pilot light. The lower end of the tube has either a single or oppositely positioned cut-out sections 15 adapted to allow inspection of the lower or free end 16 of the thermostatic strip and the electrical contacts made thereby as hereafter explained.

The gas valve is indicated generally by the numeral 17; the interior details being indicated in Figs. 2 and 4. The valve I find satisfactory is substantially a rectangular block of metal 18, having an inlet bore 19 and an outlet bore 20 to which the gas pipes 4 are connected. The rotary valve 21 is rotatably mounted in a cylindrical valve seat 22, cutting across the bores 19 and 20 and the valve has a port 23 therein. This port is of such size relative to the bores 19 and 20 and is positioned in the valve so that when the valve is in "off" position as indicated in Fig. 3, the valve port and the bores will be out of register as indicated on the left hand side of Fig. 4. When the valve is on the "light" position of Fig. 3, the port and the bores occupy the central position of Fig. 4, giving substantially a full opening. When the valve is in the "on" position indicated in Fig. 3, the port and the bores occupy the relative position as indicated in the right hand side of Fig. 4 with the gas substantially cut off.

As hereafter explained, if the pilot light goes off, the valve is automatically thrown to the "off" position. To light the valve it is manually turned to the "light" position, giving a large flow of gas and when the pilot light is burning the valve is automatically switched to the "on" position, thereby cutting down the consumption of gas.

The electro-magnetic device for controlling the valve to shut-off when the pilot light ceases to burn is illustrated particularly in Figs. 1 and 2 and comprises a pair of electro-magnets 24 and 25 mounted in a box 26. This latter is preferably made of electrically conducting material and also forms the housing for the valve 17. Each electro-magnet is formed with a metal cylindrical spool 27, insulating ends 28 and a coil of wire 29 wound thereon. A bushing 30 is fitted in one end of each spool and a screw threaded bolt 31 threaded into the bushing 30 holds the electro-magnets firmly in position. An armature 32 is slidably mounted in the spools, having its opposite ends always engaging in the spool of the magnet, the spool thus forming a guide. The armature is preferably cylindrical and is free to have slight turning movement.

The rotary gas valve 21 has a stem 33 with an aperture 34 therethrough and with an extension 35 projecting through the side 36 of the box. This projection preferably has a kerf 37 to allow turning the valve with a screw driver or the like and indicating the position. A throw over valve arm 38 is fitted in the aperture 34, being wedged tightly therein and is provided with a slot 39 engaging the pin 40 on the armature.

The end of the throw over arm has an outwardly turned contact point 41 adapted to touch the contact plates 42 and 43 on the throw over of the valve and the movement of the throwover arm.

The electrical connections and circuits are substantially as follows: A transformer 44 is of a type suitable to connect to an ordinary lighting circuit of 110 volts and delivers at the secondary 45 an electro-motor force of about 20 volts. The leads from the secondary 45 to the electro-magnets 24 and 25 are substantially as follows: A main wire 46 has a branch 47 attached to the binding post 48 on the tube 6 of the thermostat and forms an electric connection therewith. Adjustable contact pins 49 and 50 are mounted at the lower end of the thermostatic tube and comprise threaded bolts fitting an insulating bushing 51 with insulating washers 52 on the inside and outside of the tube 6. Lock nuts 53 and 54 on the inside and outside form an arrangement for adjusting the contact pins in and out of the thermostatic tube. The ends of these pins are positioned adjacent the lower end 16 of the thermostatic strip 11 and are adapted to form a contact with one pin when the strip is cold and with the other pin when the strip is hot. The pin 49 forms the contact when the strip is cold and the pin 50 when hot.

Nuts 55 are used for securing the lead wires on the outer ends of the contact pins. A lead 56 extends from the pin 49 to a binding post 57, forming one of the series mounted on the box. Each of these binding posts is fitted in an insulating bushing 58 and extends through inside and outside insulating plates 59 and 60, thereby thoroughly insulating the binding posts from the box. The lead 61 from the hot connecting pin 50 is carried to a binding post 62. The opposite side of the transformer has a lead wire 63 extending to a binding post 64 attached to the box and forms an electrical connection therewith. This may be designated as a ground connection.

The remaining portions of the electromagnetic circuit form parts of the signal light indicating circuits and are substantially as follows:

A bus bar 65 is connected to the lead 46 and has a white light 66 connected thereto, the lead 67 from the white light extending to a binding post 68 on the box. A red light 69 is also connected to the bus bar and has a lead 70 to the binding post 71 on the box.

In the position of the valve throwover arm 38 as shown in Fig. 2, that is when the pilot light is out and the thermostatic strip is cold, an electric circuit is established from the secondary 45 through the lead 46, bus bar 65, red light 69, lead 70, binding post 71, contact plate 42, the throwover arm 38, through the medium of its contact point 41 and thence to the metal structure of the box, forming the ground. The return to the transformer is through the binding post 64 and lead 63 to the secondary 45. Thus the red light will be lit when the pilot light is out and the thermostatic strip is cold. The valve is manually turned to the position marked "light" in Fig. 3, placing the valve in the central position of Fig. 4, but this still leaves the contact point 41 bearing against the plate 42. Therefore a red light is still given. When the pilot light is lit the valve is left in this position and the pilot light gradually heats the thermostatic strip 11. As above described, it is not necessary that the burner be lit to heat this thermostatic strip. As the strip becomes heated the end 61 moves from the position shown in Fig. 2, bearing against the contact pin 49 over against the contact pin 50; in part of this movement however, it is out of contact with both pins but the red light would still be left on through the circuit above described, in order to indicate that the device was not working with the thermostatic strip sufficiently heated. When contact is made between the strip and the pin 50, the electromagnetic circuit leads to the binding post 62, to the wire 72, through the winding of the electro-magnet 25 and by the lead 73 to the binding post 71. The circuit is then completed through the throwover arm 38 to the ground of the box and back to the transformer through the lead 63. This energizes the electro-magnet 25 which immediately draws the armature from the left hand to the right hand position as shown in Fig. 2. The movement of the armature breaks the contact between the throwover arm 38 and the plate 42, thereby extinguishing the red light and also de-energizing the electro-magnet 25. Thus when the throw-over arm is in the position of Fig. 1 and the white light is illuminated by the circuit the lead 46, bus 65, white light 66, lead 67, binding post 68, contact plate 43, the throwover arm, the box as a ground and return through the lead 63. This white light will therefore remain illuminated as long as the pilot light is lit and while the thermostatic strip 11 is sufficiently heated.

The action of the electro-magnet 25 in drawing the armature 32 and swinging the throwover arm is to move the valve from the position marked "light" in Fig. 3 to that marked "on" in said figure, shifting the valve port to the position shown in the right hand side of Fig. 4. This slightly cuts down the quantity of gas passing to the pilot light but leaves sufficient to form a proper flame and this flame is sufficient to maintain the thermostatic strip in contact with the pin 50 and thus the white light always lit.

When the pilot jet goes out the thermostatic strip 11 pulls and bends, making a contact with the pin 49. This establishes a circuit through the electro-magnet 24 by means of a lead 56 from the pin 49, binding post 57, lead 74 to one end of the coil and lead 75 from the other end to the binding post 68; thus establishing a circuit from this binding post through the plate 43, the valve throwover arm, the box as a ground and return by the lead 63. The energization of this electro-magnet draws the armature into the position shown in full lines in Fig. 1, breaking the contact with the plate 43, thereby de-energizing the electro-magnetic circuit and de-energizing the white light. The movement of the valve throwover arm 38 establishes the circuit through the red light as above described and at the same time places the valve in the "off" position as shown in Figs. 3 and 4.

It will thus be seen that I have provided a type of thermostat; a mounting for the pilot light, gas valve and an electric circuit with signal lights therein which gives a positive signal such as the red light when the pilot light is out, shutting off the valve, also indicating by the red signal that the pilot light is not burning sufficiently well after being lit to properly heat the thermostatic strip and therefore requiring adjustment of the pins 49 and 50; and also my safety control indicates by white lights when the pilot is burning properly and the thermostatic strip properly heated as well as automatically shutting down on the gas consumed.

It is manifest that my invention may be considerably altered to suit special installations and to adapt my invention to different types of appliances now on the market. These various changes may be made without departing from the spirit of my invention as set forth in the description, drawings and claims.

Having described my invention, what I claim is:—

1. A safety control for pilot lights comprising in combination a main burner, a pilot light, a thermostat associated with the pilot light to be heated by such pilot light in its normal operation and substantially uninfluenced by the main burner, a gas valve controlling the flow of gas to the pilot light, an electro-magnetic device operatively connected to said valve to open and close same, and an electric circuit through the thermostat to shut off the valve when the pilot light is extinguished.

2. A safety control for pilot lights comprising in combination a burner for a pilot light, a thermostat having one end extending into the burner adjacent the pilot light, a gas valve for the pilot light, an electromagnetic device operatively connected to the valve, means to manually turn the valve to a lighting position, an electric circuit through the thermostat adapted when the pilot light is lit to shift the valve restricting the flow of gas to the pilot light.

3. A safety control for pilot lights as claimed in claim 2, having in addition another electromagnetic device operatively connected to the thermostat, adapted to turn off the valve when the pilot light is extinguished.

4. A safety control for pilot lights as claimed in claim 2, having in addition a signal light adapted to indicate a safety condition, said light having an electric circuit embodying part of the circuit of the electromagnet.

5. A safety control for pilot lights comprising in combination a burner, a pilot light extending therein and having a gas pipe, a valve in said pipe, a box mounted on the valve, a pair of electro-magnets mounted in the box, a single armature positioned to travel across the valve, a throwover valve arm operatively connected between the valve and the armature, a thermostat extending below the burner, an electric circuit operatively connected through the thermostat, the electro-magnets and the valve as a ground, said circuit being adapted to close the valve on the extinguishing of the pilot light and to partially close the valve when the pilot light is burning properly.

6. A safety control for pilot lights as claimed in claim 5, having in addition a signal system comprising a pair of lights, one of said lights indicating a non-working and another a satisfactory working condition of the pilot light, said lights being in an electric circuit utilizing a connection through the valve as a ground and the same return circuit as the electro-magnetic circuits.

7. A safety control for pilot lights, comprising in combination a burner, a pilot light positioned therein, having an inlet gas pipe, a gas control valve in said pipe, a box mounted on the valve having a pair of contact plates therein, a throwover valve arm adapted to form an electric contact with the said plates, means to move said valve and shift the said arm, and electric circuits having signal lights adapted to form a circuit through either of the said plates and the arm to the valve as a ground and having a return circuit from the valve to a source of power, said signals giving indication of the satisfactory or unsatisfactory working of the pilot light.

8. A safety control for pilot lights as claimed in claim 7, in which the means to shift the lever arm comprises a plurality of electro-magnets, a thermostat positioned to be heated by the pilot light, an electric circuit through the thermostat and the electromagnets to the said plates and through the lever arm to the valve as a ground, said circuits having a common return with the lighting circuits from the valve to the source of power.

9. In a safety control for pilot lights, a burner, a pilot light positioned therein, a thermostat comprising a metal tubular body depending from the burner and electrically insulated therefrom, a thermostatic strip supported from the tube, an electric connection from a source of power to the tube, a pair of adjustable contact pins mounted in the tube and insulated therefrom, said pins being adapted to engage the free end of the thermostatic strip on the expansion or contraction of said strip.

10. In a safety control for pilot lights, a gas pipe, a valve therein, a box mounted on the valve, a pair of electro-magnets positioned at opposite ends of the box, a single slidable armature supported by said magnets, a throwover arm operatively connected from the valve to the armature, a pair of binding posts mounted on the box, a connection from each binding post to one side of the winding coils on the magnets, a second pair of binding posts mounted on the box, a pair of connections from the other side of the winding coils to the said binding posts, a pair of contact plates electrically connected to the second pair of binding posts, said plates being positioned to engage the throwover arm in its movement, electrical circuits connected to said binding posts and a return circuit operatively connected to the valve adapted to operate the electro-magnets to shift the armature and hence swing the valve throwover arm.

11. In a safety control for pilot lights as claimed in claim 10, having in addition a thermostat controlled by the pilot light and electric leads from the thermostat to the first pair of binding posts.

12. In a safety control for pilot lights as claimed in claim 10, having in addition a pair of signal lights and electric leads from said signal lights to the second pair of binding posts.

13. In a safety control for pilot lights as claimed in claim 10, having in addition a thermostat positioned to be operated by the pilot light, electric leads from the thermostat to the first pair of binding posts, a pair of signal lights and electric leads from said signal lights to the second pair of binding posts.

In testimony whereof I have signed my name to this specification.

JAMES CROMIE.